United States Patent [19]
Maehara et al.

[11] Patent Number: 4,704,674
[45] Date of Patent: Nov. 3, 1987

[54] POWER FEED APPARATUS FOR LOAD HAVING REVERSE BLOCKING CHARACTERISTICS

[75] Inventors: Naoyoshi Maehara, Shiki; Takahiro Matsumoto, Ikoma; Shigeru Kusunoki, Yamatokoriyama; Kazuho Sakamoto, Soraku; Makoto Mihara, Osaka, all of Japan

[73] Assignee: Matsushita Electric Industrial Co., Ltd., Kadoma, Japan

[21] Appl. No.: 863,251

[22] Filed: May 14, 1986

[30] Foreign Application Priority Data

May 14, 1985 [JP] Japan ................ 60-101848

[51] Int. Cl.$^4$ .......................................... H02M 3/335
[52] U.S. Cl. ..................... 363/131; 363/20; 219/10.55 B; 315/106
[58] Field of Search ............... 363/18–21, 363/131, 56; 315/105–107; 219/10.55 B; 328/270

[56] References Cited

U.S. PATENT DOCUMENTS

| | | | |
|---|---|---|---|
| 4,007,413 | 2/1977 | Fisher et al. | 363/18 |
| 4,017,784 | 4/1977 | Simmons et al. | 363/17 |
| 4,281,372 | 7/1981 | Kornrumpf | 219/10.55 B |
| 4,318,164 | 3/1982 | Onodera et al. | 363/21 |
| 4,318,165 | 3/1982 | Kornrumpf et al. | 363/21 |
| 4,593,167 | 6/1986 | Nilssen | 219/10.55 B |

*Primary Examiner*—Peter S. Wong
*Attorney, Agent, or Firm*—Wenderoth, Lind & Ponack

[57] ABSTRACT

A power feed apparatus in which a means for by-passing the current reversely biasing the load is used for the normally used rectification means when the power converted by the transformer is fed to the reversely blocking characteristics like magnetron, whereby the price is lower and the shape is more compact without the use of the rectifier, because of the combination construction of the reverse bias current by-pass means and the inductance element provided in the load current path with respect to the non-linear load like the magnetron.

5 Claims, 16 Drawing Figures

Fig. 9
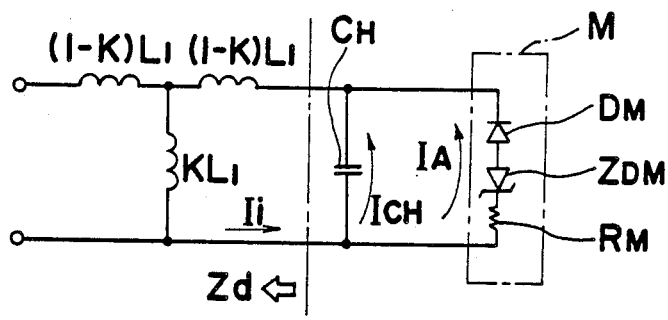
Fig. 10
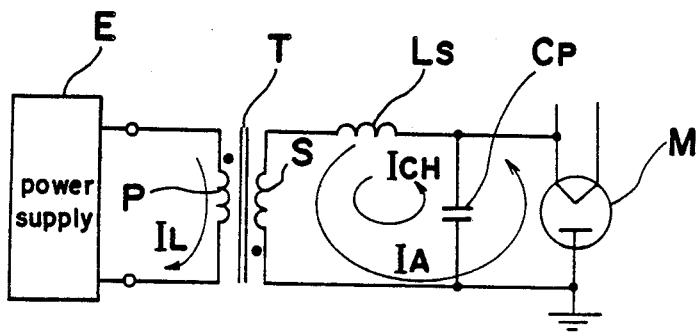
Fig. 11    Fig. 12    Fig. 13
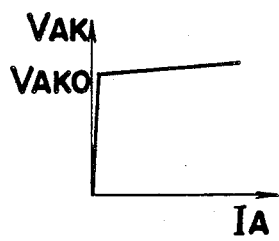 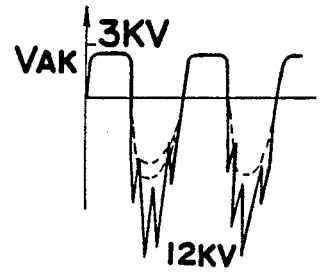 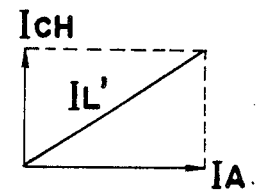
Fig. 14
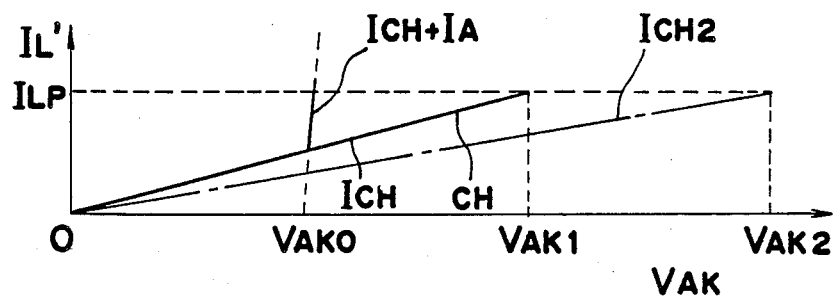

POWER FEED APPARATUS FOR LOAD HAVING REVERSE BLOCKING CHARACTERISTICS

BACKGROUND OF THE INVENTION

The present invention relates to a power feed apparatus used in high-frequency heater, which is adapted to convert power supplied through a transformer and provided from a power supply such as commercial supply or the like so as to feed the power to a load having the reverse blocking characteristics of a magnetron or the like.

Generally a magnetron power supply apparatus is an apparatus which converts power supplied by a transformer or the like to and to feed the power to, for example, a magnetron or a load having such reverse blocking characteristics.

FIG. 1 is a circuit diagram of one conventional magnetron power supply apparatus. In the drawing, the output of the power supply E provided by a commercial power supply 1 or the like is stepped up by a step up transformer T, and rectified by a capacitor C and a diode D and fed to a magnetron M. Accordingly, the waveform $V_{AK}$ of the voltage fed to the magnetron M which is a load having the reverse blocking characteristics is shown in FIG. 2(b) with respect to the power supply voltage waveform shown in FIG. 2(a). The input current I from the power supply E continuously flows as shown in FIG. 2(c). The transformer T and the power supply E stably operate without causing any inconvenience even if the load has the reverse blocking characteristics.

However, the diode D is high in cost because of the requirement of the high voltage withstanding capability and further is easily destroyed by an excessive surge current or the like through the magnetron M, so that a power feed system, which is free from this disadvantage, is desired. Since rectification at a high-frequency is required to be performed at a high voltage when the power supply E is a high-frequency power supply, it is difficult to make a diode of sufficient capability and the price can become extremely high even if it is made.

When a power feed apparatus of a type where the capacitor C and diode D of FIG. 1 are omitted may be realized as in FIG. 3, such inconveniences as described hereinabove are caused so as to make it difficult to realize the apparatus.

Namely, in the case of the apparatus of FIG. 1, the track on the B-H curve of the transformer T is 0→a→b→c→d→a, and in the case of an apparatus of FIG. 3, it is 0→a→b→c as shown in FIG. 4, thus causing the so-called deviated magnetism phenomenon, with the result that the transformer becomes very inferior in its efficiency, and the influences are worse on the operation of the power supply E.

From this background, a prior art high-frequency inverter power supply of a fly-back type for the power supply E is proposed as in FIG. 5. FIG. 5 is a circuit diagram of the other conventional power feed apparatus, and is power-supply circuit diagram of a high-frequency heating apparatus described in U.S. Pat. No. 4,318,165.

In FIG. 5, the power of the commercial power supply is rectified by a diode bridge 2, thus forming a full-wave rectified DC power supply. An inductor 3 and a capacitor 4 form a filter with respect to the high-frequency switching operation of an inverter.

The inverter is composed of a resonance capacitor 5, a step-up transformer 6, a transistor 7, a diode 8 and a driving circuit 9. The transistor 7 is caused to switch with a given period and duty cycle (namely, on to off time ratio) by the base current supplied from the driving circuit 9. As a result, a current Icd, with a collector current Ic and a, diode current Id as shown in FIG. 6(a) flows to the primary winding 10 of the transformer 6, and a high-frequency current $I_L$ as shown in FIG. 6(b) flows through the primary winding 10. Thus, a high-frequency high-voltage and a high-frequency low-voltage are respectively generated across the second winding 11 and the third winding 12 of the transformer 6. The high-frequency low-voltage is fed between the cathode terminals of the magnetron 17 through the capacitors 13 and 14 and the choke coils 15 and 16 while the high-frequency high-voltage is fed as shown between the anode and cathode of the magnetron 17. Currents as shown in FIGS. 6(c) and 6(d) respectively flow through the capacitor 5 and the magnetron 17 so that the magnetron 17 oscillates to make dielectric heating possible.

Such a construction as described hereinabove has characteristics such that the weight and size of the step-up transformer may be considerably reduced, as compared with using a step-up transformer at the commercial power-supply frequency, and, when the transistor 7 is operated with a frequency in the range of approximately 20 kHz through 100 kHz, the power-supply portion may be made smaller in size and, lower in cost.

Particularly, the high-frequency heating apparatus shown in U.S. Pat. No. 4,318,165 is constructed in the so-called fly-back type converter circuit in which the polarities of the primary winding 10 and the secondary winding 11 of the transformer 6 are shown, so that the magnetron can be driven without the use of the high-voltage diode normally used for the high-voltage rectification, thus realizing such a high-frequency as shown in FIG. 5.

Accordingly, since the high-voltage high-frequency diode which is extremely high in price and larger in size becomes unnecessary, and the higher-frequency heating apparatus is smaller, lighter, and less expensive.

However, such a conventional high-frequency heating apparatus as described hereinabove has the following defects. A converter or an inverter which is a type of power converter is described in detail in, for example, a document by L. E. Jansson "Converter Circuits for Switched-mode Power Supplies" Electronics Applications Bulletin, Vol. 32, No. 3, N. V. Philips (1973). There are a fly-back system and a forward system as a converter using one transistor. It is known that the fly-back system of converter is often used in the high-voltage producing circuit for television use, because it has the least number of components, and may be constructed lower at price.

However, in the case of handling a large amount of power as in the energy appliance, the characteristics are considerably reduced. At page 86 through page 87 of the document, this is described in detail, the addition of the various components is required to provide an output of, for example, approximately 200 W or more, to realize a converter, for handling a large amount of power of 200 W or more, by the fly-back system, the components become complicated and the price becomes higher. Also, although it is ideal to construct the leakage inductance of the transformer so as to be zero, especially for the fly-back converter, it is really difficult to realize this, so that important influences are applied to the semiconductor switch element such as transistor or the like. Since this influence becomes important as the power handled by the converter becomes larger, a protective apparatus which is bothersome and large in size is required to protect the transistor from the influence. It is therefore not suitable to apply the converter of the fly-back system for the high-frequency heating apparatus handling high power (for example, approximately 1 through 2 kW).

On the other hand, when the output of the transformer 6 is connected directly to the magnetron 17, the polarity of the transformer is one of the converter of the forward system as shown in FIG. 7, such inconveniences as described in with respect to the system shown in FIG. 3 are caused, that is, the so-called deviated magnetism phenomenon is caused to make the operation of the converter unstable.

Namely, as shown in FIG. 4, the operation track on the B-H curve of the voltage transformer 6 does not become the operation track of the normal transformer of the 0→a→b→c→d→a, but the track of the 0→a→b→a, where the efficiency becomes very inferior and the deviated magnetism phenomenon is likely to be caused. Accordingly, in the construction where the diode is omitted, it is extremely difficult to feed power to a magnetron having the reverse blocking characteristics using the forward system converter.

Furthermore, the anode current $I_A$ of the magnetron 17 becomes the current waveform having a large peak value as shown in FIG. 6(d). This is because of the fact that in the so-called fly-back type converter, the energies accumulated in the primary winding 10 for the period of time that the transistor 7 is conductive are discharged to the magnetron 17 through the secondary winding 11 for a non-conductive period. Also, since the current flows to the magnetron 17 only during the non-conductive period of the transistor 7, the peak value of the anode current $I_A$ must become much larger to provide a given average current for getting a given radio wave output.

Thus, the emission capability of the cathode of the magnetron 17 has to be enlarged, so that the magnetron 17 becomes higher in price. Also, when the finishing peak value of the anode current $I_A$ is large, the abnormal oscillation phenomenon, that is, the so-called moding phenomenon, in the frequencies except for the given frequency with respect to the emission capacity surplus is likely to be produced, thus considerably shortening the service life of the magnetron; also, since such frequencies exclude the given frequency, there are inconveniences in that the wave leakage amount of the high-frequency heating apparatus increases so as to limit the lower price of the high-frequency heating apparatus or to lower the reliability.

SUMMARY OF THE INVENTION

Accordingly, an object of the present invention is to remove the defects of the conventional apparatus, and to provide a power feed apparatus for a load having the reverse blocking characteristics, which makes the load and the operation of the power supply stable so as to improve the reliability and to suit the high-power load with a lower price.

The technical means of the present invention for solving the above-described problems forms a power feed apparatus with a power supply fed from a commercial power-supply or the like, a load having reverse blocking characteristics, a transformer for feeding frequency conversed power to this load, an inductance element provided in the flow path of the current flowing to the load, a reverse bias current by-pass means connected in parallel to the load to by-pass the reverse bias current from the transformer during the reverse bias condition of the load.

Furthermore, another embodiment of the present invention is composed of a power supply fed from a commercial power supply, at least one semiconductor switch and a power converter for producing high frequency power, a magnetron for heating food, fluid or the like, a step-up transformer for feeding the output of the power converter to the magnetron, an inductance element provided in the flow path of the current flowing to the magnetron, a reverse bias current by-pass means for by-passing the reverse bias current from the step-up transformer the reverse bias condition of the magnetron.

BRIEF DESCRIPTION OF THE DRAWINGS

These and other objects and features of the present invention will become apparent from the following description taken in conjunction with the preferred embodiment thereof with reference to the accompanying drawings, in which:

FIG. 9 is a primary-side equivalent circuit diagram of the apparatus of FIG. 8;

FIG. 10 is a circuit diagram of a power feed apparatus showing a second embodiment of the present invention;

FIG. 11 is a voltage-current characteristic chart of a magnetron employed in the apparatus of FIG. 8;

FIG. 12 is an anode voltage waveform chart of the magnetron for illustrating the operation of the power feed apparatus of the present invention;

FIG. 13 is a vector chart of the anode current $I_A$ of the magnetron, and of the capacitor current $I_{CH}$ for illustrating the operation of the power feed apparatus of the present invention;

FIG. 14 is a chart for illustrating the operation of the high-voltage capacitor of the power feed apparatus of the present invention;

DETAILED DESCRIPTION OF THE INVENTION

Figure 1:
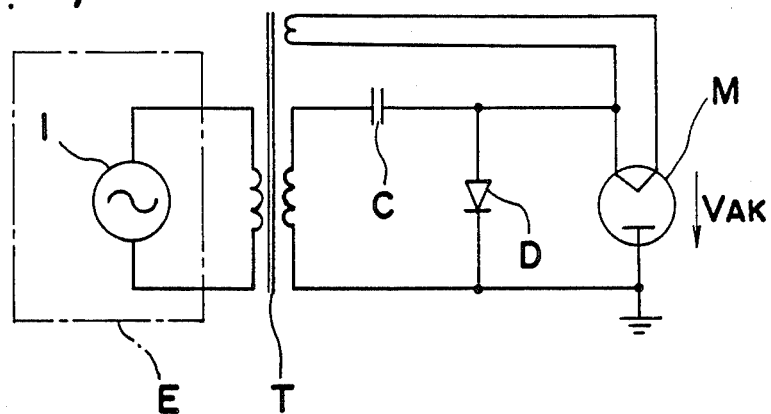
FIG. 1 is a circuit diagram of the conventional power feed apparatus (already referred to)
Figure 2:
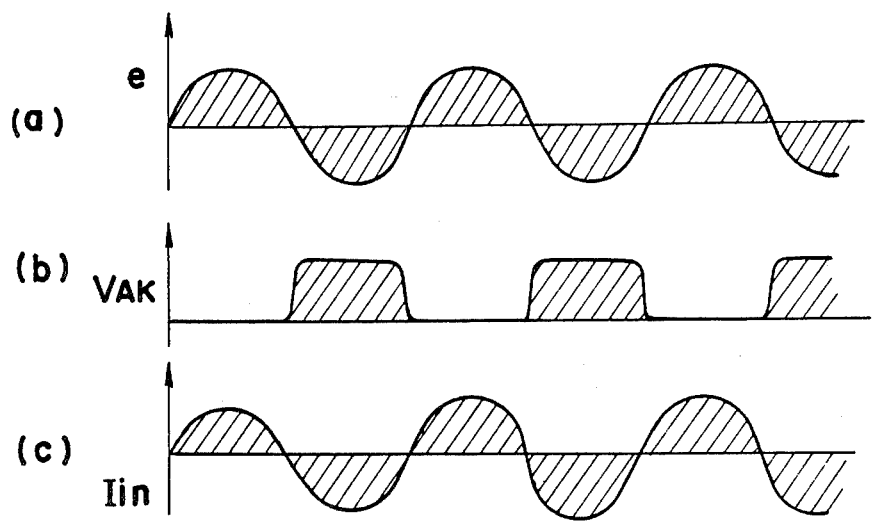
FIGS. 2(a), 2(b) and 2(c) are operating voltage current waveform charts, relating to the circuit of FIG. 1.

Before the description of the present invention proceeds, it is to be noted that like parts are designated by like reference numerals throughout the accompanying drawings.

Referring now to the drawings, there is shown a power feed apparatus for properly feeding power to a load, which has the reverse blocking characteristics such as magnetron or the like. The embodiments of the present invention will be described, which has been applied to a high-frequency heating apparatus for heating foodstuffs with the magnetron as a load.

Figure 8:
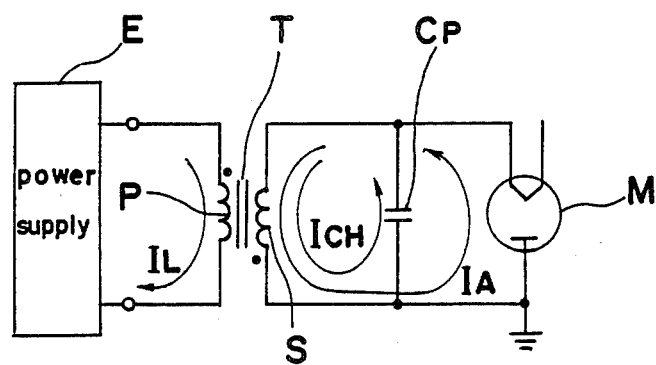
FIG. 8 is a circuit diagram of a power feed apparatus showing a first embodiment of the present invention.

In FIG. 8 showing a first embodiment of the present invention, a power supply E feeds a primary current $I_L$ to a step transformer T. The power converted by the transformer T is supplied to the magnetron M which is a load having the reverse blocking characteristics. Since the transformer T is a so-called leakage type transformer, which is constructed so as to be smaller (for example, approximately 0.6 through 0.8) in its degree of coupling between the primary and secondary windings P and S, in comparison to the normal transformer as described later, the operation is performed with the leakage inductance being inserted into the flow path of an anode current $I_A$ flowing to the magnetron M. On the other hand, a capacitor $C_P$ is connected in parallel to the magnetron M, thus forming a bypass route with respect to the magnetron M. Accordingly, even in the polarity where the magnetron M is reversely biased, the secondary current $I_{CH}$ flows to the transformer T to prevent the core of the transformer T from being deviated in its magnetism, and to prevent the open condition of the secondary winding S from being caused so that an abnormal voltage such as a spike voltage or resonance voltage through the distributed capacity of the secondary winding or the like may be prevented.

FIG. 9 is a primary-side equivalent circuit of the circuit of FIG. 8, wherein L1 is the self-inductance of the primary winding P, and K is the coupling coefficient between the primary winding P and the secondary winding S. The magnetron M may be replaced by a series circuit of a resistor RM, a diode DM, a zener diode ZDM, and a capacitor CH connected in parallel to the series circuit. The characteristics of the magnetron M are extremely non-linear as shown in FIG. 11, the dynamic impedance is extremely small. The leakage of the transformer T is made large so as to make the leakage inductance (I-K) L1 larger than that of the conventional normal transformer, so that the impedance Zd, seen from the secondary side of the transformer T is made higher to provide the transformer with a constant-current source quality. Thus, it is possible to stabilize the operation of the magnetron M or the power supply E.

FIG. 10 is a circuit diagram showing a second embodiment of the present invention. It is to be noted that like parts in FIG. 1 are designated by like reference numerals and a detailed description thereof has been omitted.

In FIG. 10, the step-up transformer T is one having a coupling coefficient K which is the same in degree as the normal transformer, that is, K=approximately 0.9 through 1.0. Accordingly, a sufficiently large inductance element cannot be inserted into the flow path of the current $I_A$ of the magnetron M only with the leakage inductance, so that an additional series inductor $L_S$ has been inserted.

The operation and effect which are the same as in FIG. 8 may be provided through this construction. The capacitor Cp, when the magnetron M is in the polarity so as to be reversely biased, prevents the abnormal high voltage as shown in FIG. 12, which is caused in the secondary winding S with the distributed capacity or the like so as to perform an operation of controlling the reverse voltage to such a relatively low value, as shown by a broken line in FIG. 12. Accordingly, since the withstanding voltage of the transformer T or the magnetron M may be made relatively lower, the manufacturing costs may be made lower.

Furthermore, the high-voltage in the reverse bias of the above-described magnetron M may be controlled to a lower value by the proper choice of the capacitor Cp.

As shown in FIG. 13, there is the phase difference of 90° between the current $I_A$ of the magnetron M and the current $I_{CH}$ of the capacitor Cp. Accordingly, the current $I_L'$ flowing to the transformer T becomes this composite current during the forward biasing of the magnetron M, while it becomes equal to the current $I_{CH}$ of the capacitor Cp during the reverse bias. FIG. 14 is a chart for illustrating this as a model. In FIG. 14, the current $I_L'$ equivalent flowing into the secondary winding S of the transformer T changes from 0 to $I_{LP}$ (only in its absolute value) for an AC, voltage. This is because the transformer is considered an ideal constant-current source.

Suppose the capacitor Cp has a certain capacity value. During the forward biasing of the magnetron M, the operation point goes as far as VAKO on $I_{CH}$, shown as a solid line in FIG. 14, from 0 and goes as far as $I_L = I_{LP}$ on the line $I_{CH} + I_A$, as soon as the current $I_A$ flows, to return to 0. Then, during the reverse biasing of the magnetron M, the operation point goes on the $I_{CH}$, shown by the solid line of FIG. 14, from 0 as far as $I_L = I_{LP}$ and returns. Accordingly, the voltage VAK (transformer secondary voltage) of the magnetron M becomes VAK=VAK1. Suppose the capacity value of the capacitor Cp is smaller and the current flowing becomes $I_{CH2}$, as shown by the one-dot chain line. Accordingly, the voltage VAK of the magnetron M during reverse bias becomes VAK=VAK2>VAK1. When the capacity value of the capacitor Cp is larger, the voltage VAK of the magnetron M may be made smaller. However, if the capacity value of the capacitor Cp is excessively large, bad influences effect the power supply E. The capacitor Cp is required to be a capacity value of the proper range. As apparent from FIG. 14, the impedance should be in the range of from the approximate impedance of the magnetron M to ten times as much or lower.

Figure 5:
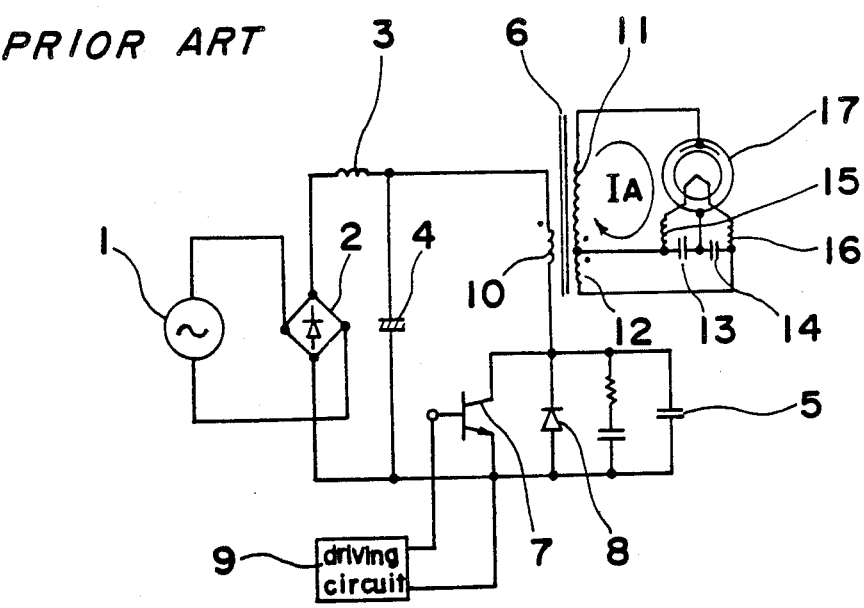
FIG. 5 is a circuit diagram of another conventional power feed apparatus using a fly-back converter.
Figure 6:
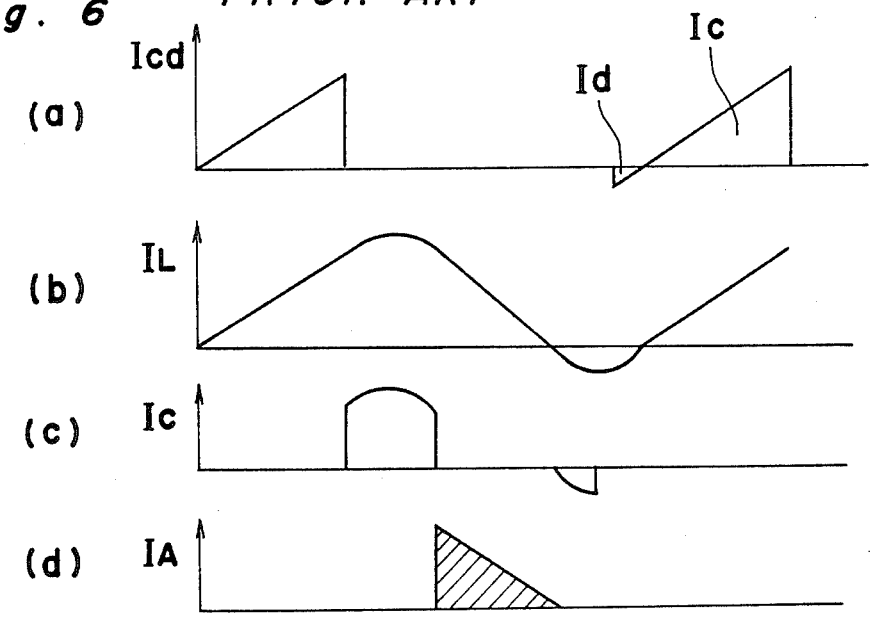
FIG. 6(a) through 6(d) are the operating voltage current waveform charts of the apparatus of FIG. 5.
Figure 7:
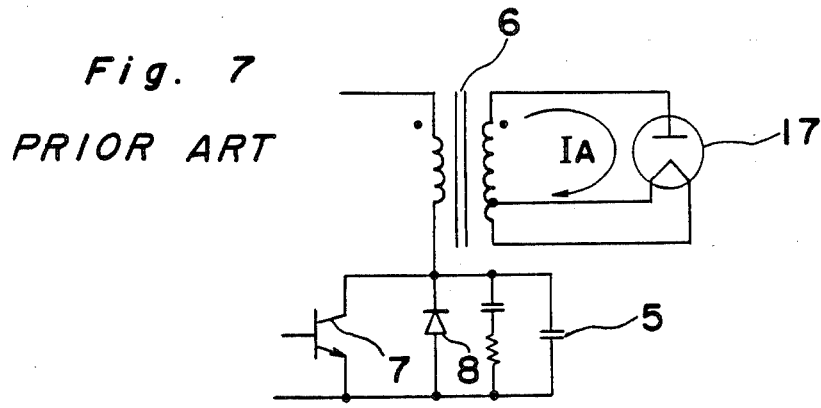
FIG. 7 is a circuit diagram for illustrating the defects of the apparatus of FIG. 5.
Figure 15:
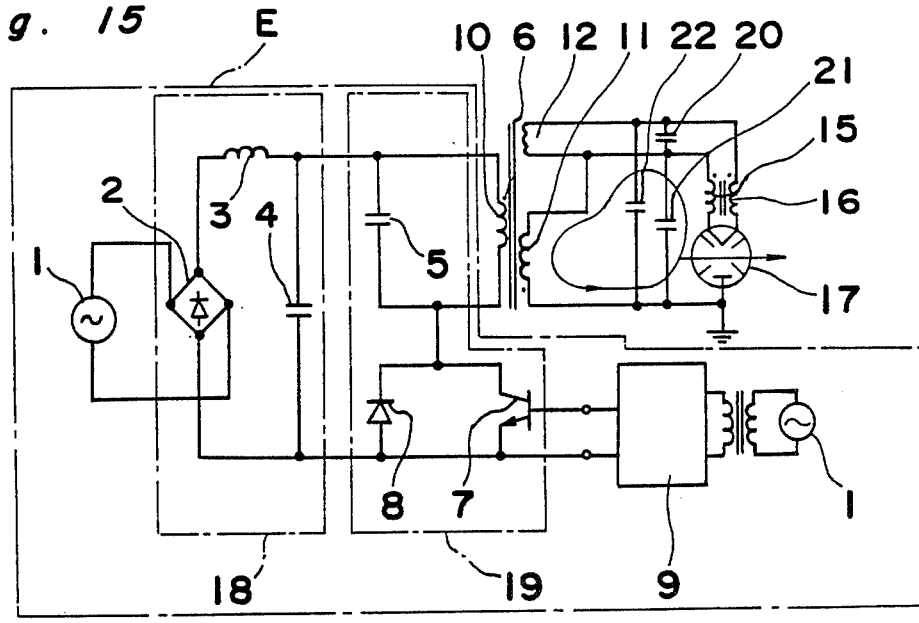
FIG. 15 is a circuit diagram of a power feed apparatus showing a third embodiment of the present invention using a forward converter.

FIG. 15 is a block diagram of a power feed apparatus showning a third embodiment of the present invention. This is an example where an inverter 19 is used in the power supply E, the same reference characters are given to the same component elements as those in the conventional example of FIG. 5.

Figure 16:
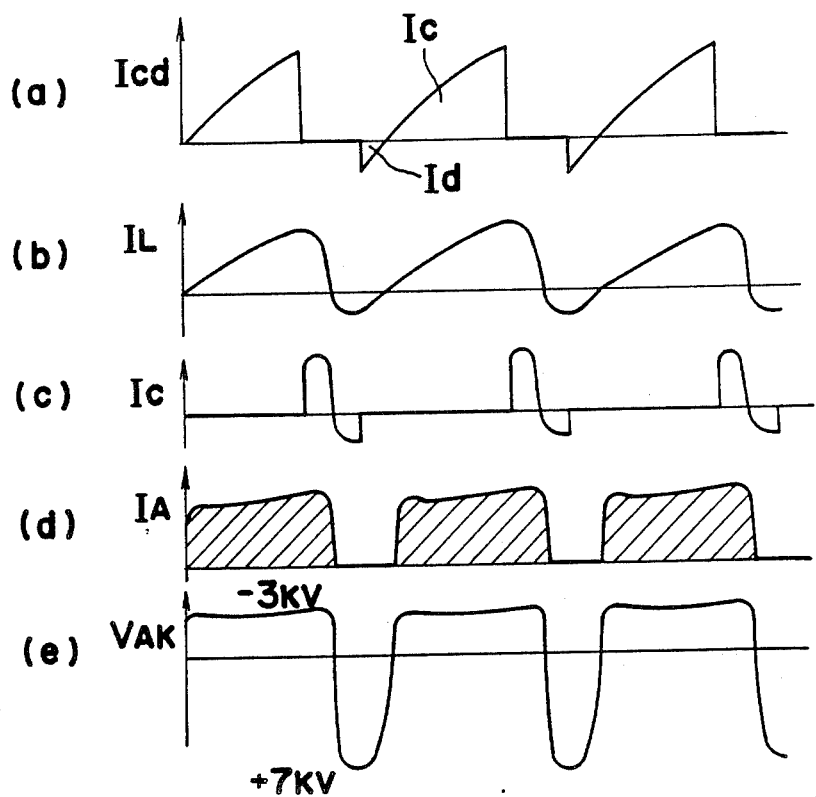
FIGS. 16(a) through 16(e) are the operating voltage current waveform charts of the apparatus of FIG. 15.

Referring to FIG. 15, the power of the commercial power supply 1 is sent to a DC power supply 18 and is fed to the inverter 19. The inverter 19 is composed of a semiconductor switch including a transistor 7. The inverter is adapted to feed the high-voltage to the magnetron 17 through the operation of the transformer 6. Currents flowing to the magnetron 17 respectively become as in FIG. 16(a), 6(b), 6(c) and 6(d). Namely, the current $I_{cd}$ with the collector current Ic and the diode current Id flows, as in FIG. 16(a), to the primary winding of the transformer 6. The high-frequency current $I_A$, as shown in FIG. 16(b), flows to the primary winding 10. A current $I_C$, as shown in FIG. 16(c), flows to the resonance capacitor 5, and an anode current $I_A$, as shown in FIG. 16(d), flows to the magnetron 17. The anode voltage of the magnetron 17 becomes as shown in FIG. 16(e). This is because the polarities of the primary winding 10 and the secondary winding 11 of the transformer 6 are provided as shown, the transformer 6 is a leakage type transformer as illustrated in FIG. 8, and, furthermore, the high-voltage capacitors 21 and 22 are connected in parallel to the magnetron 17 to form a by-pass route for by-passing the reverse bias current of the magnetron.

Also, the anode current IA is of a trapezoidal waveform which does not have the sharp peak, as shown in FIG. 16(d) due to the provision of the leakage inductance and a capacitor CH to prevent the cathode from being deteriorated and the moding from being caused so as to realize a power feed apparatus which is safe and high in reliability.

Figure 3:
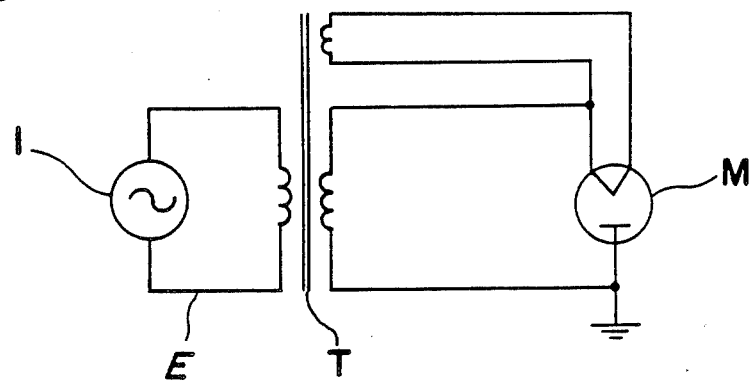
FIG. 3 is a circuit diagram of another power feed apparatus modifying the circuit of FIG. 1.
Figure 4:
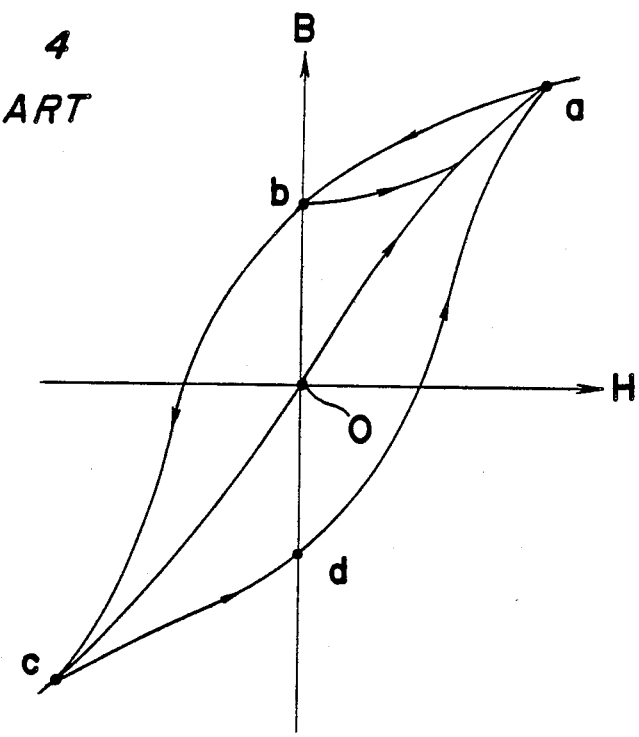
FIG. 4 is a B-H curve graph of the transformers of apparatuses of FIGS. 1 and 3.

Also, the high-voltage capacitor Cp in FIG. 8 serves as a filter capacitor of the magnetron 17 in FIG. 15, and is the first and second high-voltage capacitors 21 and 22. A capacitor 20 is provided between the cathode terminals of the magnetron 17, and the choke coils 15 and 16 are wound in the form of bifilar windings around the same core. Accordingly, the function of the high-voltage capacitor Cp in FIG. 3 is performed by the composite capacity of both the high-voltage capacitors 21 and 22. The potential difference across both the terminals of the cathode of the magnetron is reduced when the magnetron is driven by the high-frequency voltage, to promote the stable oscillation of the magnetron, and thus provide an effect of controlling the production of the high frequency.

As is clear from the foregoing description, according to the arrangement of the present invention, the effects are as follows.

(1) An apparatus for feeding the power to the load of the large power having reverse blocking characteristics is provided without causing the deviated magnetic phenomenon of the transformer or an abnormal high voltage, and in a circuit construction without a high voltage diode. An apparatus may be realized which is lower in cost, higher in reliability, and more compact in shape.

(2) Also, as the power-supply impedance seen from the load may be increased, the suppressing operation of the rush current with respect to the load having non-linear reverse blocking characteristics may be exhibited. The operation stability of the power supply or the load may be guaranteed, thus increasing the safety and reliability.

(3) Furthermore, in the case of the power supply including the inverter, converter and so on, a forward type converter suitable for the large-power load may be applied. The power feed apparatus which is lower in cost, and higher in reliability, and more compact in shape may be provided because of the absence of the high-voltage diode. The reverse bias current by-pass means is composed of a capacitor to realize the low-pass filter operation through the combination with the inductance element. The high-frequency component of the feed power to the load having the reverse blocking characteristics may be controlled. Accordingly, a power feed apparatus which is more stabilized in the operation of the load and the power supply may be provided.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A power feed apparatus comprising: a power supply which is fed with an AC power of a first frequency from a commercial source of power, said power supply outputting a conversion AC power of a second frequency which is higher than that of said first frequency; a load having reverse blocking characteristics; a transformer for feeding said conversion AC power to said load through an inductance element provided in the flow path of the current flowing to said load, and a reverse bias current by-pass means connected in parallel with said load so as to by-pass a reverse bias current which is generated when said load is reverse biased.

2. An apparatus as recited in claim 1, wherein said reverse bias current by-pass means comprises a capacitor.

3. A power feed apparatus comprising: a power source which is fed with an AC power of a first frequency from a commercial source of power; a power conversion means for generating a high frequency AC conversion power of a second frequency which is higher than that of said first frequency and including at least one semiconductor switch and a means for driving said switch; a load having reverse blocking characteristics; a transformer for feeding said conversion AC power to said load through an inductance element provided in the flow path of the current flowing to said load, and a reverse bias current by-pass means connected in parallel with said load so as to by-pass a reverse bias current which is generated when said load is reverse biased.

4. A power feed apparatus for feeding power to a magnetron comprising:
a commercial source of AC power of a first frequency;
an inverter means for converting AC power supplied by said commercial source of power to a conversion AC power of a second frequency which is higher than that of said first frequency;
a transformer which is directly connected to said inverter means and is connected to said inverter via a series inductance means for transmitting said conversion AC power directly to said magnetron;
and a reverse bias current by-pass means connected in parallel with said magnetron.

5. An apparatus as recited in claim 4, wherein said reverse bias current by-pass means comprises a capacitor.

* * * * *